(12) United States Patent
Hu

(10) Patent No.: US 11,949,966 B2
(45) Date of Patent: Apr. 2, 2024

(54) PROCESSING METHOD, APPARATUS, MEDIUM AND DEVICE FOR TRACK DATA IN MULTIMEDIA RESOURCE

(71) Applicant: Tencent Technology (Shenzhen) Company Limited, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/988,713

(22) Filed: Nov. 16, 2022

(65) Prior Publication Data
US 2023/0188812 A1    Jun. 15, 2023

Related U.S. Application Data

(63) Continuation of application No. PCT/CN2022/083956, filed on Mar. 30, 2022.

(30) Foreign Application Priority Data

May 24, 2021  (CN) .......................... 202110567993.0

(51) Int. Cl.
  *H04N 21/85*   (2011.01)
  *H04N 19/44*   (2014.01)
  *H04N 21/235*  (2011.01)

(52) U.S. Cl.
  CPC ............. *H04N 21/85* (2013.01); *H04N 19/44* (2014.11); *H04N 21/235* (2013.01)

(58) Field of Classification Search
  CPC ...... H04N 21/85; H04N 21/44; H04N 21/235; H04N 21/236

USPC ......................................................... 725/105
See application file for complete search history.

(56) References Cited

FOREIGN PATENT DOCUMENTS

| CN | 111416976 A | 7/2020 |
|----|-------------|--------|
| CN | 111526365 A | 8/2020 |
| CN | 111526368 A | 8/2020 |

(Continued)

OTHER PUBLICATIONS

X. Gao, H. Yu, Q. Yuan, X. Lin and L. Yu, "Standard Designs for Cross Random Access Point Reference in Video Coding," 2019 Picture Coding Symposium (PCS), Ningbo, China, 2019, pp. 1-5, doi: 10.1109/PCS48520.2019.8954520. (Year: 2019).*

(Continued)

*Primary Examiner* — Dominic D Saltarelli
(74) *Attorney, Agent, or Firm* — Morgan, Lewis & Bockius LLP

(57) ABSTRACT

A computer device receives a signaling file corresponding to a multimedia resource. The signaling file includes descriptors corresponding to a plurality of track data of the multimedia resource, respectively. Dependency identifiers included in the descriptors correspond to the main bitstream track data pointing to descriptors corresponding to the library picture track data. The computer device parses the signaling file and determines a dependency relationship between the main bitstream track data and the library picture track data according to the dependency identifiers. The computer device sequentially acquires the library picture track data and the main bitstream track data from a data source side according to the dependency relationship.

19 Claims, 6 Drawing Sheets

(56) References Cited

FOREIGN PATENT DOCUMENTS

WO     WO 2020229734 A1    11/2020

OTHER PUBLICATIONS

Tencent Technology, ISR, PCT/CN2022/083956, Jun. 21, 2022, 2 pgs.
Tencent Technology, WO, PCT/CN2022/083956, Jun. 21, 2022, 4 pgs.

* cited by examiner

PROCESSING METHOD, APPARATUS, MEDIUM AND DEVICE FOR TRACK DATA IN MULTIMEDIA RESOURCE

CROSS-REFERENCE TO RELATED APPLICATIONS

This application is a continuation application of PCT Patent Application No. PCT/CN2022/083956, entitled "PROCESSING METHODS, DEVICES, MEDIA AND EQUIPMENT FOR TRACK DATA IN MULTIMEDIA RESOURCES" filed on Mar. 30, 2022, which claims priority to Chinese Patent Application No. 202110567993.0, filed with the State Intellectual Property Office of the People's Republic of China on May 24, 2021, and entitled "PROCESSING METHOD, APPARATUS, MEDIUM AND DEVICE FOR TRACK DATA IN MULTIMEDIA RESOURCE", all of which are incorporated herein by reference in their entirety.

FIELD OF THE TECHNOLOGY

This application relates to the field of computer and communication technologies, and specifically, to a processing method, apparatus, a medium and a device for track data in a multimedia resource.

BACKGROUND OF THE DISCLOSURE

To improve the video compression efficiency in a video coding-decoding technology based on the third-generation audio video coding standard (AVS3), a concept of library picture is proposed, that is, a main bitstream and a library picture bitstream can be generated during the coding of video sequences, and reference can be made to picture frames in the library picture bitstream during the decoding of picture frames in the main bitstream.

SUMMARY

Embodiments of this application provide a processing method and apparatus for track data in a multimedia resource, a computer-readable storage medium, and a device. Furthermore, an association relationship among all track data may be acquired in advance at least to a certain extent according to the signaling file, and an unnecessary time delay caused by the need of temporarily acquiring the library picture track data is avoided.

In one aspect of an embodiment of this application, a processing method for track data in a multimedia resource is provided. The method includes: receiving a signaling file corresponding to a multimedia resource, the signaling file including descriptors corresponding to a plurality of track data of the multimedia resource, respectively, the plurality of track data including main bitstream track data corresponding to a main bitstream and library picture track data corresponding to a library picture bitstream, and dependency identifiers included in the descriptors corresponding to the main bitstream track data pointing to descriptors corresponding to the library picture track data; parsing the signaling file, and determining a dependency relationship between the main bitstream track data and the library picture track data according to the dependency identifiers; and sequentially acquiring the library picture track data and the main bitstream track data from a data source side according to the dependency relationship.

In one aspect of an embodiment of this application, a processing method for track data in a multimedia resource is provided. The method includes: generating a signaling file corresponding to a multimedia resource, the signaling file including descriptors corresponding to a plurality of track data of the multimedia resource, respectively, the plurality of track data including main bitstream track data corresponding to a main bitstream and library picture track data corresponding to a library picture bitstream, and dependency identifiers included in the descriptors corresponding to the main bitstream track data pointing to descriptors corresponding to the library picture track data; transmitting the signaling file to a data receiver, so as to enable the data receiver to determine a dependency relationship between the main bitstream track data and the library picture track data according to the dependency identifiers in the signaling file; and sequentially acquiring the library picture track data and the main bitstream track data from a data source side according to the dependency relationship.

In one aspect of an embodiment of this application, a processing apparatus for track data in a multimedia resource is provided. The apparatus includes: a receiving unit configured to receive a signaling file corresponding to a multimedia resource, the signaling file including descriptors corresponding to a plurality of track data of the multimedia resource, respectively, the plurality of track data including main bitstream track data corresponding to a main bitstream and library picture track data corresponding to a library picture bitstream, and dependency identifiers included in the descriptors corresponding to the main bitstream track data pointing to descriptors corresponding to the library picture track data; a parsing unit configured to parse the signaling file, and determine a dependency relationship between the main bitstream track data and the library picture track data according to the dependency identifiers; and an acquisition unit configured to acquire the library picture track data and the main bitstream track data from a data source side in sequence according to the dependency relationship.

In some embodiments of this application, on the basis of the aforementioned solution, the descriptors corresponding to the library picture track data include first element information. The first element information is used for indicating that the descriptors including the first element information are the descriptors corresponding to the library picture track data.

In some embodiments of this application, on the basis of the aforementioned solution, the plurality of track data includes at least two pieces of library picture track data, and a descriptor corresponding to each piece of library picture track data in the at least two pieces of library picture track data include second element information; and the second element information is used for indicating a track group where each piece of library picture track data in the at least two pieces of library picture track data resides.

In some embodiments of this application, on the basis of the aforementioned solution, a descriptor corresponding to each piece of library picture track data in the at least two pieces of library picture track data includes third element information; and the third element information is used for indicating whether the plurality of main bitstream track data is dependent on each piece of library picture track data in the at least two pieces of library picture track data.

In some embodiments of this application, on the basis of the aforementioned solution, if target library picture track data on which the plurality of main bitstream track data is dependent exists in the at least two pieces of library picture track data, a descriptor corresponding to the target library picture track data further includes fourth element information; and the fourth element information is used for indicating a frame rate of specified main bitstream track data in the plurality of main bitstream track data.

In some embodiments of this application, on the basis of the aforementioned solution, a descriptor corresponding to each piece of library picture track data in the at least two pieces of library picture track data further includes a sample index identifier; and the sample index identifier is used for indicating a sample index number interval for indexing each piece of library picture track data in the at least two pieces of library picture track data from the main bitstream track data.

In some embodiments of this application, on the basis of the aforementioned solution, the sample index identifier includes fifth element information and sixth element information; the value of the fifth element information indicates the minimum value of a sample index number of each piece of library picture track data in the at least two pieces of library picture track data from the main bitstream track data; and the value of the sixth element information indicates the maximum value of a sample index number of each piece of library picture track data in the at least two pieces of library picture track data from the main bitstream track data.

In some embodiments of this application, on the basis of the aforementioned solution, the main bitstream track data includes an index identifier, and the index identifier is used for indicating library picture track data on which the main bitstream track data is dependent or indicating a library picture track group on which the main bitstream track data is dependent.

In some embodiments of this application, on the basis of the aforementioned solution, the main bitstream track data includes a track reference type data box, the track reference type data box includes a reference type field, and the reference type field is used for representing the index identifier.

In some embodiments of this application, on the basis of the aforementioned solution, the main bitstream track data includes a track reference data box, and the track reference data box includes the track reference type data box.

In some embodiments of this application, on the basis of the aforementioned solution, the plurality of track data includes at least two pieces of library picture track data, and each piece of library picture track data in the at least two pieces of library picture track data includes a track group identifier; and the track group identifier is used for indicating a track group where each piece of library picture track data in the at least two pieces of library picture track data resides.

In some embodiments of this application, on the basis of the aforementioned solution, each piece of library picture track data in the at least two pieces of library picture track data further includes first field information used for indicating whether a plurality of main bitstream track data is dependent on each piece of library picture track data in the at least two pieces of library picture track data; and if the first field information indicates that a piece of main bitstream track data is dependent on library picture track data, the library picture track data further includes a field indicating the minimum value of a sample index number for indexing the library picture track data in the piece of main bitstream track data, and a field indicating the maximum value of a sample index number for indexing the library picture track data in the piece of main bitstream track data.

In some embodiments of this application, on the basis of the aforementioned solution, if the first field information indicates that a plurality of main bitstream track data is dependent on library picture track data, the library picture track data further includes a field indicating the minimum value of a sample index number for indexing the library picture track data in each piece of main bitstream track data in the plurality of main bitstream track data, a field indicating the maximum value of a sample index number for indexing the library picture track data in each piece of main bitstream track data in the plurality of main bitstream track data, and a field for indicating a frame rate of each piece of main bitstream track data in the plurality of main bitstream track data.

In some embodiments of this application, on the basis of the aforementioned solution, each piece of library picture track data in the at least two pieces of library picture track data further includes first field information used for indicating whether a plurality of main bitstream track data is dependent on each piece of library picture track data in the at least two pieces of library picture track data; and if the first field information indicates that a piece of main bitstream track data is dependent on library picture track data, the library picture track data further includes a field indicating a sample group quantity for indexing the library picture track data in the piece of main bitstream track data, and a field indicating a sample group index number for indexing the library picture track data in the piece of main bitstream track data.

In some embodiments of this application, on the basis of the aforementioned solution, if the first field information indicates that a plurality of main bitstream track data is dependent on library picture track data, the library picture track data further includes a field indicating a sample group quantity for indexing the library picture track data in each piece of main bitstream track data in the plurality of main bitstream track data, a field indicating a sample group index number for indexing the library picture track data in each piece of main bitstream track data in the plurality of main bitstream track data, and a field for indicating a frame rate of each piece of main bitstream track data in the plurality of main bitstream track data.

In some embodiments of this application, on the basis of the aforementioned solution, the processing apparatus for track data in a multimedia resource further includes: a decoding unit configured to determine a decoding sequence according to the dependency relationship; and perform decoding processing on the library picture track data and the main bitstream track data in sequence according to the decoding sequence to obtain the multimedia resource.

In some embodiments of this application, on the basis of the aforementioned solution, the decoding unit is configured to: decode the main bitstream track data; during the decoding to obtain a sample index number interval that needs to refer to library picture track data in the main bitstream track data, determine library picture track data needing to be referred to from the plurality of library picture track data according to the sample index number interval; and decode the library picture track data needing to be referred to.

In one aspect of an embodiment of this application, a processing apparatus for track data in a multimedia resource is provided. The apparatus includes: a generation unit configured to generate a signaling file corresponding to a multimedia resource, the signaling file including descriptors corresponding to a plurality of track data of the multimedia resource, respectively, the plurality of track data including main bitstream track data corresponding to a main bitstream and library picture track data corresponding to a library picture bitstream, and dependency identifiers included in the descriptors corresponding to the main bitstream track data pointing to descriptors corresponding to the library picture track data; a transmitting unit configured to transmit the signaling file to a data receiver, so as to enable the data receiver to determine a dependency relationship between the main bitstream track data and the library picture track data according to the dependency identifiers in the signaling file; and acquire the library picture track data and the main bitstream track data in sequence from a data source side according to the dependency relationship.

In some embodiments of this application, on the basis of the aforementioned solution, the generation unit is further configured to: before generating a signaling file corresponding to a multimedia resource, generate main bitstream track data corresponding to a main bitstream and a library picture track data corresponding to a library picture bitstream, the main bitstream track data including an index identifier and the index identifier being used for indicating library picture track data on which the main bitstream track data is dependent.

In one aspect of an embodiment of this application, a non-transitory computer-readable storage medium is provided, storing a computer program, the computer program, when executed by a processor, implementing the processing method for track data in a multimedia resource according to the foregoing embodiments In one aspect of an embodiment of this application, an electronic device is provided, including: one or more processors; and a storage apparatus, configured to store one or more programs, the one or more programs, when executed by the one or more processors, causing the one or more processors to implement the processing method for track data in a multimedia resource according to the foregoing embodiments In one aspect of an embodiment of this application, a computer program product or a computer program is provided, including computer instructions, the computer instructions being stored in a computer-readable storage medium. A processor of a computer device reads the computer instructions from the computer-readable storage medium, and executes the computer instructions, causing the computer device to perform the processing method for track data in a multimedia resource according to the foregoing exemplary embodiments.

In the technical solutions provided in some embodiments of this application, by receiving a signaling file corresponding to a multimedia resource, determining a dependency relationship between main bitstream track data and library picture track data according to the dependency identifiers included in descriptors corresponding to a plurality of track data of the multimedia resource, respectively, and descriptors corresponding to the main bitstream track data and then acquiring the library picture track data and the main bitstream track data from a data source side in sequence according to the dependency relationship, a data receiver may acquire an association relationship among all track data in advance according to the signaling file to determine whether to acquire the library picture track data and request which kind of library picture track data. In this way, on the premise of ensuring reasonable distribution of network and CPU resources, an unnecessary time delay caused by the need of temporarily acquiring the library picture track data is avoided and the coding and decoding efficiency of media resources is improved.

It is to be understood that the foregoing general descriptions and the following detailed descriptions are merely exemplary and explanatory, and cannot limit this application.

DESCRIPTION OF EMBODIMENTS

Now, exemplary implementations are described comprehensively with reference to the accompanying drawings. However, the exemplary implementations may be implemented in various forms, and it should not be understood as being limited to the examples described herein. Conversely, the implementations are provided to make this application more comprehensive and complete, and comprehensively convey the idea of the exemplary implementations to a person skilled in the art.

In addition, the described features, structures or characteristics may be combined in one or more embodiments in any appropriate manner. In the following descriptions, a lot of specific details are provided to give a comprehensive understanding of the embodiments of this application. However, a person of ordinary skill in the art is to be aware that, the technical solutions in this application may be implemented without one or more of the particular details, or another method, unit, apparatus, or step may be used. In other cases, well-known methods, apparatuses, implementations, or operations are not shown or described in detail, in order not to obscure the aspects of this application.

The block diagrams shown in the accompanying drawings are merely functional entities and do not necessarily correspond to physically independent entities. That is, such functional entities may be implemented by using software, or implemented in one or more hardware modules or integrated circuits, or implemented in different networks and/or processor apparatuses and/or micro-controller apparatuses.

The flowcharts shown in the accompanying drawings are merely examples for descriptions, do not necessarily include all content and operations/steps, and are not necessarily performed in the described orders. For example, some operations/steps may be further divided, while some operations/steps may be combined or partially combined. Therefore, an actual execution order may vary depending on an actual situation.

It should be noted that "plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
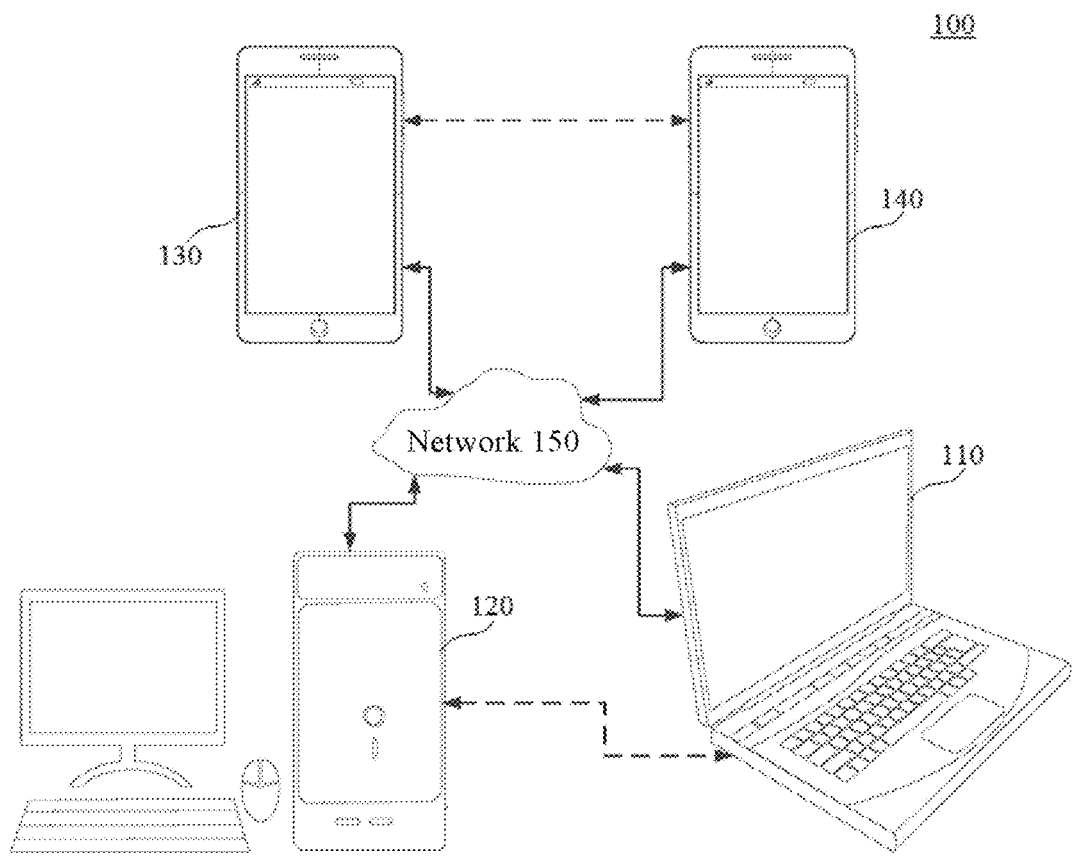
FIG. 1 is a schematic diagram of an exemplary system architecture to which a technical solution according to an embodiment of this application may be applied.

FIG. 1 is a schematic diagram of an exemplary system architecture to which a technical solution according to an embodiment of this application may be applied.

As shown in FIG. 1, the system architecture 100 includes a plurality of terminal devices which may communicate with each other by for example a network 150. For example, the system architecture 100 may include a first terminal device 110 and a second terminal device 120 which interconnect with each other by the network 150. In an embodiment of FIG. 1, the first terminal device 110 and the second terminal device 120 perform unidirectional data transmission.

For example, the first terminal device 110 may be used for coding video data (such as a video picture stream collected by the first terminal device 110) to transmit the data to the second terminal device 120 by the network 150, and transmit coded video data in the form of one or more coded video bitstreams. The second terminal device 120 may receive the coded video data from the network 150, decode the coded video data to restore video data, and display a video picture according to the restored video data.

In one embodiment of this application, the system architecture 100 may include a third terminal device 130 and a fourth terminal device 140, which are used for performing bidirectional transmission of the coded video data; and the bidirectional transmission, for example, may occur during videoconferencing. With regards to bidirectional data transmission, each one of the third terminal device 130 and the fourth terminal device 140 may code video data (such as a video picture stream collected by the terminal device) and transmit the data to the other terminal device of the third terminal device 130 and the fourth terminal device 140 by the network 150. Each one of the third terminal device 130 and the fourth terminal device 140 may receive the coded video data transmitted by the other terminal device of the third terminal device 130 and the fourth terminal device 140, decode the coded video data to restore video data, and display a video picture on an accessible display device according to the restored video data.

In an embodiment of FIG. 1, the first terminal device 110, the second terminal device 120, the third terminal device 130 and the fourth terminal device 140 may be servers, personal computers and smart phones, but the principle disclosed in this application is not limited herein. An embodiment disclosed in this application is applicable to laptop computers, tablet personal computers, media players and/or special videoconferencing devices. The network 150 is a network for transmitting any quantity of the coded video data among the first terminal device 110, the second terminal device 120, the third terminal device 130 and the fourth terminal device 140, including, for example, wired and/or wireless communication networks. The communication network 150 may exchange data in circuit switching and/or packet switching channels. This network may include a telecommunication network, a local area network, a wide area network and/or the Internet. For the purpose of this application, unless explained below, the architecture and topology of the network 150 may be insignificant to the operations disclosed in this application.

Figure 2:
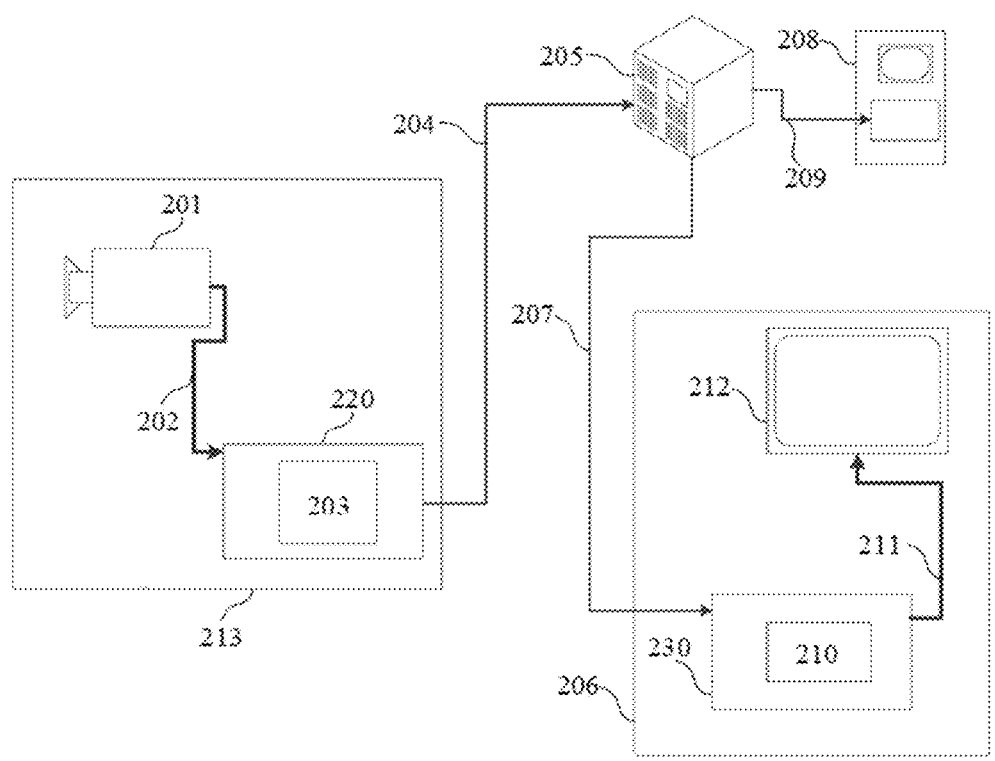
FIG. 2 is a schematic diagram of a placement mode of a video coding apparatus and a video decoding apparatus in a stream transmission system.

In an embodiment of this application, FIG. 2 shows a placement mode of a video coding apparatus and a video decoding apparatus in a stream transmission environment. The subject matter disclosed in this application may be equally applicable to other applications that support videos, including, for example, videoconferencing, digital television (TV), storing compressed videos on digital media including a CD, a DVD, a memory stick, etc.

The stream transmission system may include a collection subsystem 213. The collection subsystem 213 may include a video source 201 including a digital camera, etc., and an uncompressed video picture stream 202 is created by the video source. In an embodiment, the video picture stream 202 includes a sample photographed by the digital camera. Compared with coded video data 204 (or a coded video bitstream 204), the video picture stream 202 is depicted as a thick line to emphasize a video picture stream with a high data volume. The video picture stream 202 may be processed by an electronic apparatus 220 which includes a video coding apparatus 203 coupled to a video source 201. The video coding apparatus 203 may include hardware, software or a combination thereof to achieve or implement all aspects of the subject matter of the present disclosure, as described in more details below. Compared with the video picture stream 202, the coded video data 204 (or the coded video bitstream 204) is depicted as a thin line to emphasize coded video data 204 (or a coded video bitstream 204) with a low data volume, which may be stored on a stream transmission server 205 for later use. One or more stream transmission client subsystems, for example, a client subsystem 206 and a client subsystem 208 in FIG. 2 may access a stream transmission server 205 to retrieve a copy 207 and a copy 209 of the coded video data 204. The client subsystem 206 may include, for example, a video decoding apparatus 210 in an electronic apparatus 230. The video decoding apparatus 210 decodes the inputted copy 207 of the coded video data and generates an output video picture stream 211 displayed on a display 212 (such as a display screen) or another presentation apparatus. In some stream transmission systems, the coded video data 204, video data 207 and video data 209 (such as a video bitstream) may be coded according to certain video coding/compression standards. Embodiments of these standards include ITU-T H.265, Audio Video Coding Standard (AVS) of China, etc. This application may be used for the context of AVS.

It is important to note that the electronic apparatus 220 and the electronic apparatus 230 may include other components not shown in the figures. For example, the electronic apparatus 220 may include a video decoding apparatus and the electronic apparatus 230 may further include a video coding apparatus.

In one embodiment of this application, by taking high efficiency video coding (HEVC), versatile video coding (VVC) and AVS as examples, after a video frame picture is inputted, the video frame picture may be divided into a plurality of processing units that are not overlapped according to a block size; and each processing unit performs similar compression operation. This processing unit is called a coding tree unit (CTU) or a largest coding unit (LCU). The CTU may be further divided in more details to obtain one or more basic coding units (CUs), and the CU is the most basic element in a coding link. Some concepts during coding will be described below:

Predictive coding: The predictive coding includes intra-frame prediction and inter-frame prediction. After an original video signal is predicted by a selected reconstructed video signal, a residual video signal is obtained. A coding end needs to decide to select which one predictive coding mode for the current unit and inform of a decoding end. The intra-frame prediction means that a predicted signal comes from a region coded and reconstructed in a same picture. The inter-frame prediction means that the predicted signal comes from other pictures (referred to as reference pictures) which are coded and are different a current picture.

Transform & quantization: After a residual video signal is subjected to transform operation such as discrete Fourier transform (DFT) and discrete cosine transform (DCT), the signal is transformed into a transform domain, which is called a transformation coefficient. The transformation coefficient is further subjected to lossy quantization operation to lose certain information, such that a quantized signal beneficial to compression expression. In some video coding standards, there may be more than one transform mode for selection. Therefore, the coding end also needs to select one transform mode in the current CU and informs of the decoding end. Usually, the fineness of quantization is usually determined by a quantization parameter (QP for short). If the value of the QP is larger, coefficients in a larger value range will be quantized into a same output. This usually leads to greater distortion and a lower bit rate. On the contrary, if the value of the QP is smaller, coefficients in a smaller value range will be quantized into a same output. This usually leads to smaller distortion and a corresponding higher bit rate.

Entropy coding or statistical coding: A quantized transform domain signal will be statistically compressed and coded according to the frequency of each value, and finally, a binary compressed bitstream (0 or 1) is outputted. Meanwhile, other information such as a selected coding mode and motion vector data is generated by coding, and entropy coding also needs to be performed to reduce the bit rate. The statistical coding is a lossless coding method, which can effectively reduce a bit rate required to express the same signal. A common statistical coding method includes variable length coding (VLC for short) or content adaptive binary arithmetic coding (CABAC for short).

Loop filtering: A reconstructed picture is acquired from a changed and quantized signal through the operations of inverse quantization, inverse transformation and predictive compensation. Compared with an original picture, there are influences caused by quantization on the reconstructed picture, part of information is different from the original picture, that is, the reconstructed picture will have distortion. Therefore, filtering operation may be performed on the reconstructed picture, such as a deblocking filter (DB for short), a sample adaptive offset or an adaptive loop filter, which may effectively reduce the distortion degree generated by quantization. Since these filtered reconstructed pictures are used as a reference of a subsequent coded picture to predict a future picture signal, the aforementioned filtering operation is also called loop filtering, that is, filtering operation within a coding loop.

Figure 3:
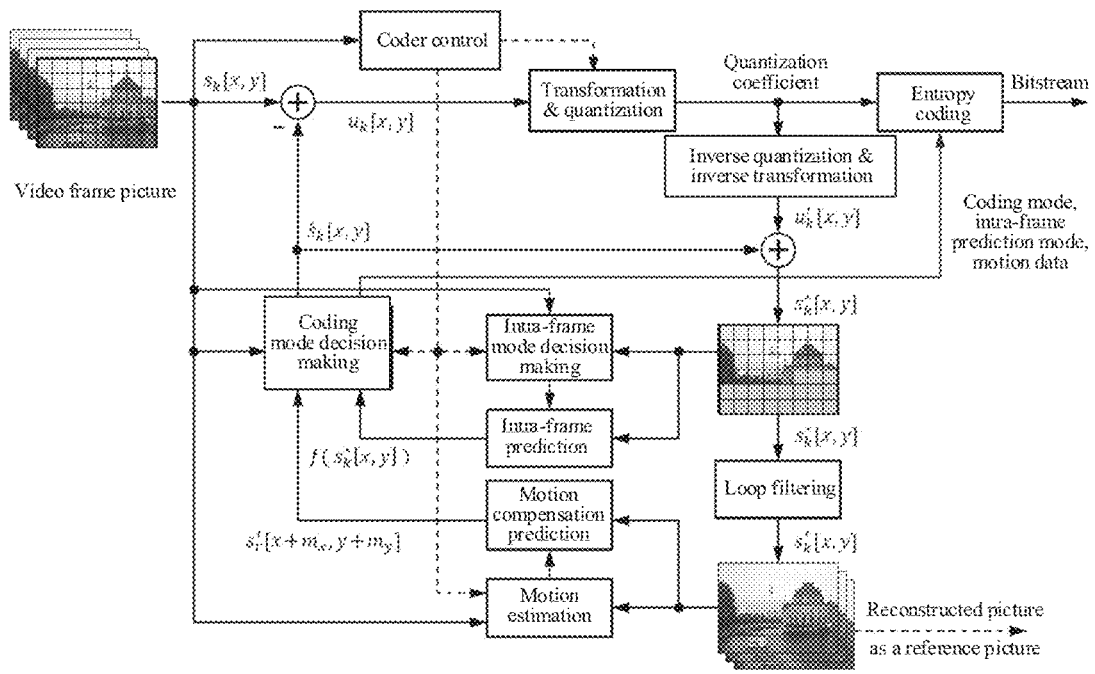
FIG. 3 is a basic flowchart of a video coder.

In an embodiment of this application, FIG. 3 is a basic flowchart of a video coder. The intra-frame prediction is taken as an example for illustration in this flow. Difference operation is performed on an original picture signal $s_k[x,y]$ and a predicted picture signal $\hat{s}_k[x, y]$ to obtain a residual signal $u_k[x,y]$. After transformation and quantization processing of the residual signal $u_k[x, y]$, a quantization coefficient is obtained. On one hand, the quantization coefficient is subjected to entropy coding to obtain a coded bitstream. On the other hand, inverse quantization and inverse transformation processing is performed ton the coded bitstream to obtain a reconstructed residual signal $u'_k[x, y]$. The predicted picture signal $\hat{s}_k[x,y]$ and the reconstructed residual signal $u'_k[x,y]$ are overlapped to generate a picture signal $s^*_k[x,y]$. On one hand, $s^*_k[x,y]$ a picture signal is inputted into an intra-frame decision making module and an intra-frame prediction module to perform intra-frame prediction processing. On the other hand, a reconstructed picture signal is outputted by loop filtering $s'_k[x,y]$. The reconstructed picture signal $s'_k[x,y]$ may be used as a next frame of reference picture for motion estimation and motion compensation prediction. Then, the next frame of the predicted picture signal is obtained based on a motion compensation prediction result $s'_r[x+m_x,y+m_y]$ and an intra-frame prediction result $f(s^*_k[x,y])$, and the aforementioned process is continually repeated $\hat{s}_k[x,y]$ until coding is completed.

On the basis of the aforementioned coding process, after a compressed bitstream (that is, a bitstream) is acquired for each CU of the decoding end, entropy decoding is performed to obtain each mode information and quantization coefficient. Then, the quantization coefficient is subjected to inverse quantization and inverse transformation processing to obtain a residual signal. On the other hand, a predicted signal corresponding to this CU may be acquired according to known coding mode information; and then, the residual signal and the predicted signal are added to obtain a reconstructed signal; and the reconstructed signal is subjected to operations such as loop filtering to generate a final output signal.

Figure 4:
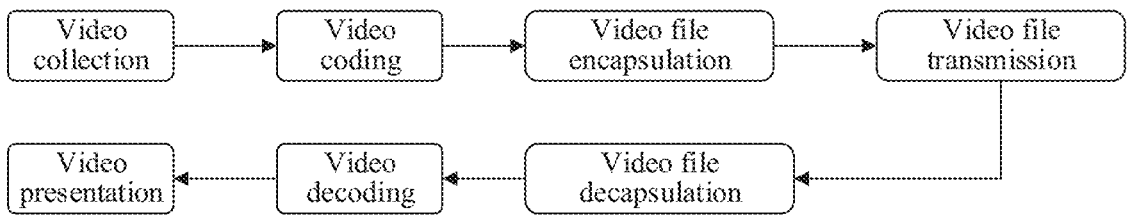
FIG. 4 is an overall transmission flowchart of a video file according to an embodiment of this application.

Briefly speaking, an overall transmission process of video files is shown as FIG. 4. A video file is obtained by video acquisition. After video coding and encapsulation processing of the video file, the video file is transmitted to a receiver. After receiving the video file, the receiver performs decapsulation on the video file. After decapsulation, video decoding processing is performed to finally present a decoded video.

Figure 5:
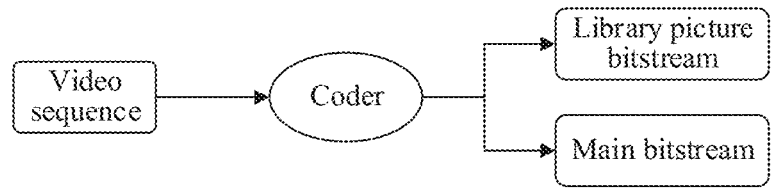
FIG. 5 is a schematic diagram of coding of a video sequence to generate a main bitstream and a library picture bitstream.

In the AVS3 video coding-decoding technology, a concept of library picture is put forward to improve the video compression efficiency. As shown in FIG. 5, a main bitstream and a library picture bitstream may be generated during the coding of video sequences, and reference may be made to picture frames in the library picture bitstream during the decoding of picture frames in the main bitstream. The picture frames in the library picture bitstream are library pictures. The library picture may be a type of special 1-frame picture. As an independent picture, this picture may be referred by a B frame and/or a P frame in the main bitstream during decoding. The difference between the library picture and the I frame in the main bitstream is that the library picture will not be used for displaying and presenting. The main bitstream and the library picture bitstream may correspond to a same original video sequence.

At the same time, the related art also proposes the signaling of segment-dependent descriptors. Specifically, an EssentialProperty element of the @schemeIdUri property of "urn:avs:ims:2018:ds"(dependent segment) represents a segment-dependent descriptor. At least one segment-dependent descriptor is specified on a representation layer, and cannot be specified on a media presentation description (MPD) layer and an adaptation set layer. The segment-dependent descriptor indicates that there is an atemporal dependency relationship between each segment in each representation and other segments (which may be segments in a same representation or segments in different representations). URLs or indicators of other representation-dependent segments and picture numbers for a compression layer in the segments are included in this descriptor.

Although the related art indicates information of a sample of a library picture referred by some samples in the main bitstream, a dependency relationship between fragment levels is also put forward in the aspect of segments. However, these sample-grade dependency and association relationships may be acquired only if a decoder parses a specific sample segment. If a corresponding library picture track is not requested or decoded before by the data receiver, the library picture track needs to be requested or decoded temporarily, thus bringing about unnecessary time delay and reducing the coding and decoding efficiency of media resources.

Therefore, the technical solution of an embodiment of this application provides a novel processing solution for track data in a multimedia resource, such that the data receiver may acquire an association relationship among all track data in advance according to the signaling file to determine whether to acquire the library picture track data and request which kind of library picture track data. In this way, on the premise of ensuring reasonable distribution of network and CPU resources, an unnecessary time delay caused by the need of temporarily acquiring the library picture track data is avoided and the coding and decoding efficiency of media resources is improved.

The implementation details of the technical solutions of the embodiments of this application are described below in detail.

Figure 6:
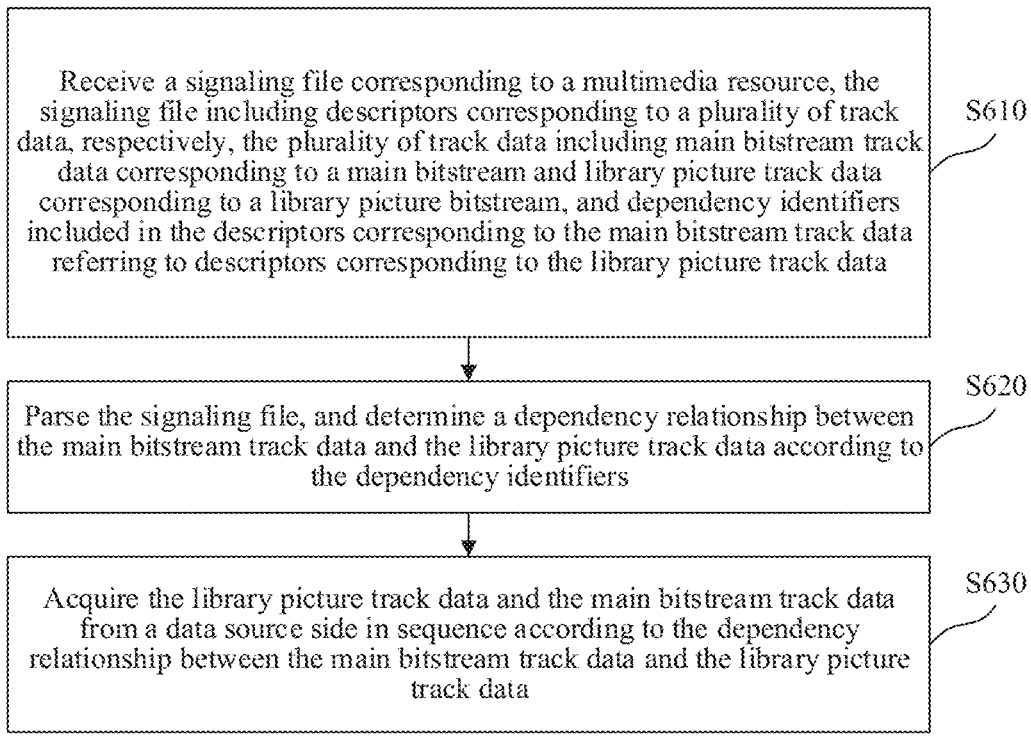
FIG. 6 is a flowchart of a processing method for track data in a multimedia resource according to an embodiment of this application.

FIG. 6 is a flowchart of a processing method for track data in a multimedia resource according to an embodiment of this application. The processing method for track data in a multimedia resource may be performed by a multimedia playing device. The multimedia playing device may be a computing device such as a smart phone, a tablet personal computer, etc. Referring to FIG. 6, the processing method for track data in a multimedia resource includes step S610 to step S630, which are described in detail as follows:

Step S610: Receive a signaling file corresponding to a multimedia resource. The signaling file includes descriptors corresponding to a plurality of track data of the multimedia resource. The plurality of track data includes main bitstream track data corresponding to a main bitstream and library picture track data corresponding to a library picture bitstream. The dependency identifiers included in descriptors corresponding to the main bitstream track data point to descriptors corresponding to the library picture track data on which the dependency identifiers are dependent.

It should be noted that the multimedia resource includes specific multimedia resource data, for example, specific content (a video frame, an introduction audio, etc.) including an introduction video for an article A. The signaling file corresponding to the multimedia resource may be a dynamic adaptive streaming over HTTP (DASH) signaling file.

In an implementation, the plurality of track data of the multimedia resource may include one piece of library picture track data, or a plurality of library picture track data.

In an embodiment of this application, descriptors corresponding to library picture track data may include first element information. The first element information is used for indicating that the descriptors including the first element information are the descriptors corresponding to the library picture track data.

In an embodiment of this application, if a plurality of track data of a multimedia resource includes at least two pieces of library picture track data, a descriptor corresponding to each piece of library picture track data in the at least two pieces of library picture track data includes second element information. The second element information is used for indicating a track group where each piece of library picture track data in the at least two pieces of library picture track data resides.

In an embodiment of this application, if a plurality of track data of a multimedia resource includes at least two pieces of library picture track data, a descriptor corresponding to each piece of library picture track data in the at least two pieces of library picture track data may include third element information. The value of the third element information is used for indicating whether the plurality of main bitstream track data is dependent on each piece of library picture track data in the at least two pieces of library picture track data. For example, if the value of the third element information is 1, it means that the plurality of main bitstream track data is dependent on this library picture track data. If the value of the third element information is 0, it means that a piece of main bitstream track data is dependent on this library picture track data.

In an embodiment of this application, if a plurality of track data of a multimedia resource includes at least two pieces of library picture track data and target library picture track data on which the plurality of main bitstream track data is dependent exists therein, a descriptor corresponding to the target library picture track data further includes fourth element information. The fourth element information is used for indicating a frame rate of specified main bitstream track data in the plurality of main bitstream track data. In an implementation, this specified main bitstream track data may be a plurality of main bitstream track data or a part of main bitstream track data therein.

In an embodiment of this application, if a plurality of track data of a multimedia resource includes at least two pieces of library picture track data, a descriptor corresponding to each piece of library picture track data in the at least two pieces of library picture track data further includes a sample index identifier. The sample index identifier is used for indicating a sample index number interval for indexing each piece of library picture track data in the at least two pieces of library picture track data from the main bitstream track data. In an implementation, the sample index identifier includes fifth element information and sixth element information. The value of the fifth element information indicates the minimum value of a sample index number of each piece of library picture track data in the at least two pieces of library picture track data from the main bitstream track data. The value of the sixth element information indicates the maximum value of a sample index number of each piece of library picture track data in the at least two pieces of library picture track data from the main bitstream track data.

Step S620: Parse the signaling file, and determine a dependency relationship between the main bitstream track data and the library picture track data according to the dependency identifiers.

Step S630: Acquire the library picture track data and the main bitstream track data from a data source side in sequence according to the dependency relationship between the main bitstream track data and the library picture track data.

In an embodiment of this application, there is a dependency relationship between main bitstream track data and library picture track data, so that the main bitstream track data is acquired from a data source side after the library picture track data is acquired.

In an implementation, if there is a plurality of library picture track data, the library picture track data that needs to be referred by the main bitstream track data may be acquired firstly. After that, if other library picture track data that needs to be referred is decoded during the decoding of the main bitstream track data, the other library picture track data are acquired. Certainly, decoding processing may be performed after the main bitstream track data and all the library picture track data are acquired.

In an embodiment of this application, main bitstream track data may include an index identifier. The index identifier is used for indicating library picture track data on which the main bitstream track data is dependent or indicating a library picture track group on which the main bitstream track data is dependent.

In an implementation, the main bitstream track data includes a track reference type data box, the track reference type data box includes a reference type field, and the reference type field is used for representing the index identifier. On this basis, the value of the reference type field is used for indicating a library picture track group on which the main bitstream track data or such library picture track group.

In an embodiment of this application, main bitstream track data may include a track reference data box. In this case, the track reference data box includes the track reference type data box.

In an embodiment of this application, a plurality of track data of a multimedia resource may include at least two pieces of library picture track data. Each piece of library picture track data in the at least two pieces of library picture track data includes a track group identifier. The track group identifier is used for indicating a track group w % here each piece of library picture track data in the at least two pieces of library picture track data resides.

In an embodiment of this application, after a data receiver acquires library picture track data and main bitstream track data in sequence from a data source side according to a dependency relationship, a decoding sequence may be determined according to this dependency relationship. After that, decoding processing is performed on the library picture track data and the main bitstream track data in sequence according to the determined decoding sequence to obtain a multimedia resource.

In an embodiment of this application, main bitstream track data may be decoded firstly. While decoding to obtain a sample index number interval that needs to refer to library picture track data in the main bitstream track data, library picture track data needing to be referred to is determined from the plurality of library picture track data according to the sample index number interval. After that, the library picture track data that needs to be referred is decoded. In an implementation, decoding processing may be performed after the main bitstream track data and all the library picture track data are acquired. Alternatively, the library picture track data that needs to be referred by the main bitstream track data may be acquired firstly. After that, if other library picture track data that needs to be referred is decoded during the decoding of the main bitstream track data, the other library picture track data are acquired.

In an embodiment of this application, if a multimedia resource includes at least two pieces of library picture track data, each piece of library picture track data in the at least two pieces of library picture track data further includes first field information used for indicating whether a plurality of main bitstream track data is dependent on the library picture track data. In an implementation, the first field information may be, for example, multi_main_bitstream. If the value of multi_main_bitstream is 1, it means that a plurality of main bitstream track data is dependent on library picture track data. If the value of multi_main_bitstream is 0, it means that a piece of main bitstream track data is dependent on library picture track data.

In an embodiment of this application, if the first field information indicates that a piece of main bitstream track data is dependent on library picture track data, the library picture track data further includes a field indicating the minimum value of a sample index number for indexing the library picture track data in the piece of main bitstream track data, and a field indicating the maximum value of a sample index number for indexing the library picture track data in the piece of main bitstream track data In an implementation, a field indicating the minimum value of the sample index number may be sample_number_min, and a field indicating the maximum value of the sample index number may be sample_number_max. Segments between the minimum value and maximum value of the sample index number in the main bitstream track data need to be dependent on the library picture track data.

In an embodiment of this application, if the first field information indicates that a plurality of main bitstream track data is dependent on library picture track data, the library picture track data further includes a field indicating the minimum value of a sample index number for indexing the library picture track data in each piece of main bitstream track data in the plurality of main bitstream track data, a field indicating the maximum value of a sample index number for indexing the library picture track data in each piece of main bitstream track data in the plurality of main bitstream track data, and a field for indicating a frame rate of each piece of main bitstream track data in the plurality of main bitstream track data. Similarly, a field indicating the minimum value of the sample index number may be sample_number_min, and a field indicating the maximum value of the sample index number may be sample_number_max.

In an embodiment of this application, if the first field information indicates that a piece of main bitstream track data is dependent on library picture track data, the library picture track data further includes a field indicating a sample group quantity for indexing the library picture track data in the piece of main bitstream track data, and a field indicating a sample group index number for indexing the library picture track data in the piece of main bitstream track data. In an implementation, a field indicating a sample group quantity may be num_sample_groups and a field indicating a sample group index number may be group_description_index.

In an embodiment of this application, if the first field information indicates that a plurality of main bitstream track data is dependent on library picture track data, the library picture track data further includes a field indicating a sample group quantity for indexing the library picture track data in each piece of main bitstream track data in the plurality of main bitstream track data, a field indicating a sample group index number for indexing the library picture track data in each piece of main bitstream track data in the plurality of main bitstream track data, and a field for indicating a frame rate of each piece of main bitstream track data in the plurality of main bitstream track data. Similarly, a field indicating a sample group quantity may be num_sample_groups and a field indicating a sample group index number may be group_description_index.

FIG. 6 illustrates a technical solution of an embodiment of this application from a receiver of media resources. The implementation details of the embodiment of this application will be further explained from the data source side with reference to FIG. 7.

Figure 7:
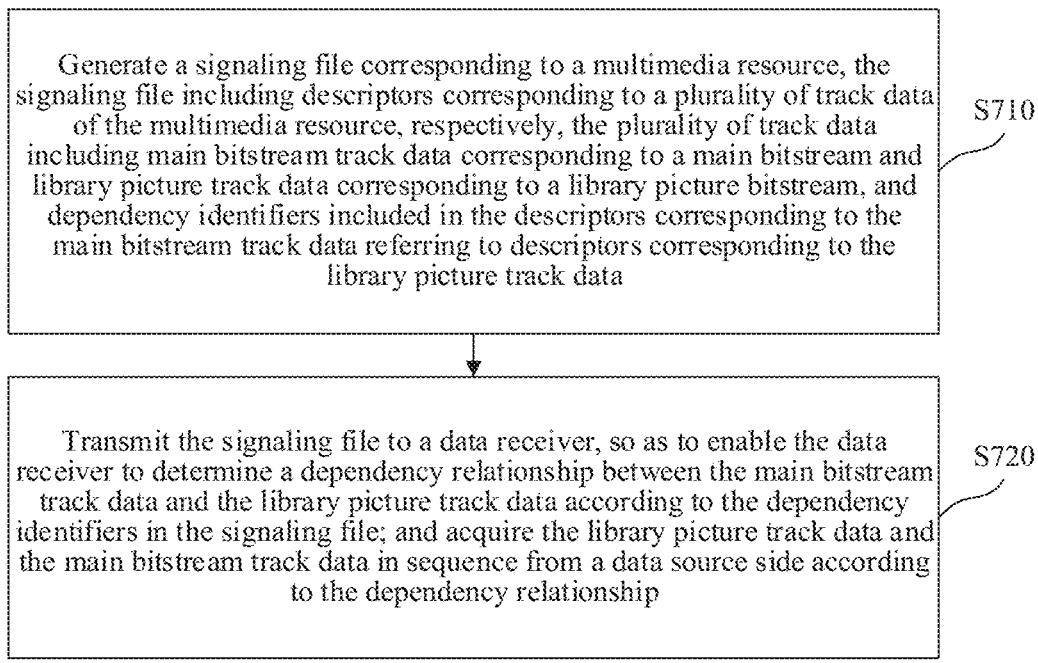
FIG. 7 is a flowchart of a processing method for track data in a multimedia resource according to an embodiment of this application.

FIG. 7 is a flowchart of a processing method for track data in a multimedia resource according to an embodiment of this application. The processing method for track data in a multimedia resource may be performed by a multimedia generation device. The multimedia generation device may be a computing device (e.g., an electronic device) such as a smart phone, a tablet personal computer, etc. Referring to FIG. 7, the processing method for track data in a multimedia resource includes step S710 to step S720, which are described in detail as follows:

Step S710: Generate a signaling file corresponding to a multimedia resource, the signaling file including descriptors corresponding to a plurality of track data of the multimedia resource, respectively, the plurality of track data including main bitstream track data corresponding to a main bitstream and library picture track data corresponding to a library picture bitstream, and dependency identifiers included in the descriptors corresponding to the main bitstream track data pointing to descriptors corresponding to the library picture track data.

It should be noted that the multimedia resource includes specific multimedia resource data, for example, specific content (a video frame, an introduction audio, etc.) including an introduction video for an article A. The signaling file corresponding to the multimedia resource may be a DASH signaling file.

In an implementation, a plurality of track data of the multimedia resource may include one piece of library picture track data, or a plurality of library picture track data.

In an embodiment of this application, descriptors corresponding to library picture track data may include first element information, and the first element information is used for indicating that the descriptors including the first element information are the descriptors corresponding to the library picture track data.

In an embodiment of this application, if a plurality of track data of a multimedia resource includes at least two pieces of library picture track data, a descriptor corresponding to each piece of library picture track data in the at least two pieces of library picture track data includes second element information; and the second element information is used for indicating a track group where each piece of library picture track data in the at least two pieces of library picture track data resides.

In an embodiment of this application, if a plurality of track data of a multimedia resource includes at least two pieces of library picture track data, a descriptor corresponding to each piece of library picture track data in the at least two pieces of library picture track data may include third element information, and the value of the third element information is used for indicating whether the plurality of main bitstream track data is dependent on each piece of library picture track data in the at least two pieces of library picture track data. For example, if the value of the third element information is 1, it means that the plurality of main bitstream track data is dependent on this library picture track data. If the value of the third element information is 0, it means that a piece of main bitstream track data is dependent on this library picture track data.

In an embodiment of this application, if a plurality of track data of a multimedia resource includes at least two pieces of library picture track data and target library picture track data on which the plurality of main bitstream track data is dependent exists therein, a descriptor corresponding to the target library picture track data further includes fourth element information. The fourth element information is used for indicating a frame rate of specified main bitstream track data in the plurality of main bitstream track data. In an implementation, this specified main bitstream track data may be a plurality of main bitstream track data or a part of main bitstream track data therein.

In an embodiment of this application, if a plurality of track data of a multimedia resource includes at least two pieces of library picture track data, a descriptor corresponding to each piece of library picture track data in the at least two pieces of library picture track data further includes a sample index identifier. The sample index identifier is used for indicating a sample index number interval for indexing each piece of library picture track data in the at least two pieces of library picture track data from the main bitstream track data. In an implementation, the sample index identifier includes fifth element information and sixth element information. The value of the fifth element information indicates the minimum value of a sample index number of each piece of library picture track data in the at least two pieces of library picture track data from the main bitstream track data. The value of the sixth element information indicates the maximum value of a sample index number of each piece of library picture track data in the at least two pieces of library picture track data from the main bitstream track data.

Step S720: Transmit the signaling file to a data receiver, so as to enable the data receiver to determine a dependency relationship between the main bitstream track data and the library picture track data according to the dependency identifiers in the signaling file; and acquire the library picture track data and the main bitstream track data in sequence from a data source side according to the dependency relationship.

In an embodiment of this application, before generating a signaling file corresponding to a multimedia resource on a server side, main bitstream track data corresponding to a main bitstream and library picture track data corresponding to a library picture bitstream may be generated. The main bitstream track data includes an index identifier, and the index identifier is used for indicating library picture track data on which the main bitstream track data is dependent or indicating a library picture track group on which the main bitstream track data is dependent.

In an implementation, the main bitstream track data includes a track reference type data box, the track reference type data box includes a reference type field, and the reference type field is used for representing the index identifier. On this basis, the value of the reference type field is used for indicating a library picture track group on which the main bitstream track data or such library picture track group.

In an embodiment of this application, main bitstream track data may include a track reference data box. In this case, the track reference data box includes the track reference type data box.

In an embodiment of this application, a plurality of track data of a multimedia resource may include at least two pieces of library picture track data, and each piece of library picture track data in the at least two pieces of library picture track data includes a track group identifier; and the track group identifier is used for indicating a track group where each piece of library picture track data in the at least two pieces of library picture track data resides.

In an implementation, other related content of the data in the library picture track group may refer to the technical solution of the aforementioned embodiments, and details are not described herein.

A technical solution of an embodiment of this application is elaborated from a data receiver and a data source side, respectively. The implementation details of the embodiment of this application will be further explained on the whole from the data source side with reference to FIG. 8.

Figure 8:
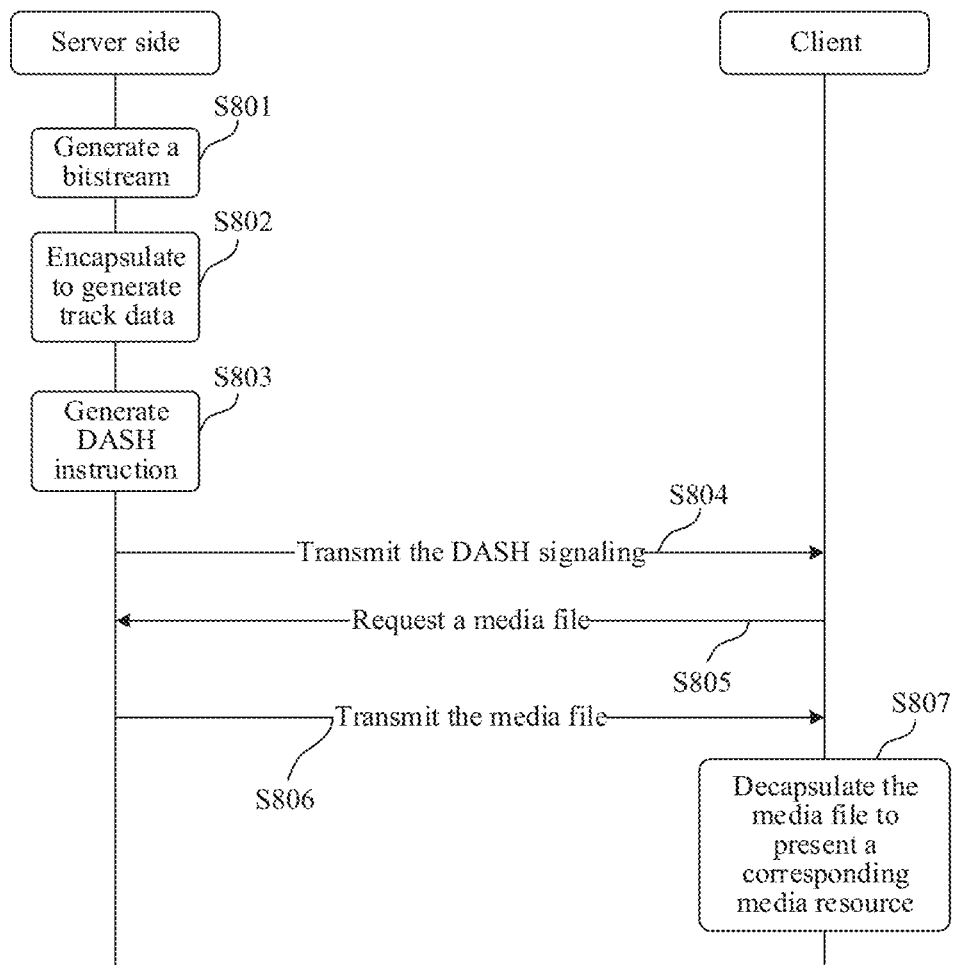
FIG. 8 is a flowchart of a processing method for track data in a multimedia resource according to an embodiment of this application.

As shown in FIG. 8, by taking a server side as the data source side and a client as the data receiver for example, the following step S801 to step S807 may be specifically included:

Step S801: Generate a bitstream on a server side.

In an embodiment of this application, the server side may generate a main bitstream and one or more library picture bitstreams during video coding.

Step S802: Encapsulate at the server side to generate track data.

In an embodiment of this application, during the encapsulation of a signaling file, the server side may encapsulate a main bitstream into an individual file track, also encapsulate each library picture bitstream into an individual file track, and associate a main bitstream track and a library picture track by an index relationship therebetween according to a reference relationship between the main bitstream and the library picture bitstream during decoding. If the main bitstream track needs to refer to a plurality of library picture tracks, these library picture tracks may be associated by a track group and different library picture tracks are distinguished in the track group by sample index range information, description information, etc.

In an implementation, one main bitstream track may be associated with one library picture track or one library picture track group. A plurality of main bitstream tracks (generally, a plurality of tracks with the same content and different frame rates) may also be associated with a same library picture track or library picture track group.

Step S803: Generate DASH signaling on the server side.

In an embodiment of this application, the server side may specially mark a media resource corresponding to a library picture bitstream during signaling generation, and indicate a dependency relationship between a main bitstream media resource and a library picture bitstream media resource. If the main bitstream media resource needs to refer to a plurality of library picture bitstream media resources, these library picture bitstream media resources may be associated with one another and distinguished by using sample index range information, description information, etc. All the aforementioned information is included in the DASH signaling.

Step S804: Transmit the DASH signaling to a client.

Step S805: Request a media file from the server side by the client according to the DASH signaling.

In an embodiment of this application, the client judges whether a needed media resource is dependent on a media resource corresponding to the library picture bitstream according to the signaling file. If so, the media resource corresponding to the library picture bitstream is requested firstly. If the needed media resource is dependent on media resources corresponding to a plurality of library picture bitstreams, a corresponding media resource is requested according to sample index range information to which currently presented frames belong.

Step S806: Transmit a media file from the server side to the client.

Step S807: Decapsulate the media file by the client to present a corresponding media resource.

In an embodiment of this application, after requesting a corresponding media resource, the client may decode track data corresponding to the library picture bitstream firstly according to an index relationship between file tracks. If there is a library picture track group, that is, track data corresponding to a main bitstream is dependent on track data corresponding to a plurality of library picture bitstreams, corresponding track data is decoded according to sample index range information to which currently presented frames belong.

To implement the technical solution of the aforementioned embodiment, some descriptive field information is added to the embodiments of this application. A form of extending an ISOBMFF data box and DASH MPD signaling is taken as an example to define relevant fields for supporting an AVS3 library picture technology as follows:

1. Define an Index Relationship Between a Library Picture Track and a Main Bitstream Track:

In an embodiment of this application, the main bitstream track may be indexed to the library picture track on which its decoding is dependent by a track index data box. A corresponding TrackReferenceTypeBoxes field needs to be added to a TrackReferenceBox field of the main bitstream track. In the TrackReferenceTypeBoxes field, track IDs indicates a library picture track or a library picture track group that is indexed by a current main bitstream track.

Specifically, an index between the main bitstream track and the library picture track is identified by a corresponding reference_type index type in the TrackReferenceTypeBoxes field. The type field is defined as follows:

'a3lr': an indexed track is a library picture track corresponding to the current track.

In an implementation, one main bitstream track may be associated with at least one library picture track or library picture track group by 'a3lr'. Multiple main bitstream tracks may be associated with one library picture track or library picture track group by 'a3lr'.

2. Define a Library Picture Track Group:

In an embodiment of this application, if one main bitstream track needs to refer to a plurality of library picture tracks, these library picture tracks need to be associated by the library picture track group. In an implementation, one definition of the library picture track group is as follows:

```
aligned(8) class Avs3Library GroupBox extends
TrackGroupTypeBox('a3lg')
{
    // track_group_id is inherited from TrackGroup TypeBox;
    unsigned int(1) multi_main_bitstream;
    bit(7) reserved;
    if(!multi_main_bitstream){
        unsigned int(32)  sample_number_min;
        unsigned int(32)  sample_number_max;
    }
    else {
        unsigned int(8) num_main_bitstream;
        for(i=0; i<num_main_bitstream; i++){
            unsigned int(8) frame_rate;
            unsigned int(32) sample_number_min;
            unsigned int(32) sample_number_max;
        }
    }
    string track_description;   // optional
}
```

In the aforementioned definition, the library picture track group is obtained by extending a track group data box and is identified by the 'a3lg' track group type. In all tracks including the 'a3lg' type TrackGroupTypeBox, tracks with the same group ID belong to the same track group. The semantics of each field in Avs3LibraryGroupBox is defined as follows:

The multi_main_bitstream field indicates whether the library picture track group is referred by a plurality of main bitstream tracks. When the value of this field is 1, it means that the library picture track group is referred by a plurality of main bitstream tracks. When the value of this field is 0, it means that the library picture track group is referred by only one main bitstream track. In an implementation, the value of this field is 0 by default.

The sample_number_min field indicates that the minimum value of a sample index number of a current library picture track group is indexed in a main bitstream track or a main bitstream track with a special frame rate.

The sample_number_max field indicates that the maximum value of a sample index number of a current library picture track group is indexed in a main bitstream track or a main bitstream track with a special frame rate.

The frame_rate field indicates a frame rate of a certain track in a plurality of main bitstream tracks when the library picture track is referred by the plurality of main bitstream tracks.

The track_description field is a character string ended with a null character and indicates description information of the library picture track. In an implementation, different tracks in the same library picture track may also be distinguished by using sample group information. Specifically, another definition of the library picture track group is as follows:

```
aligned(8) class Avs3Library GroupBox extends
TrackGroupTypeBox('a3lg')
{
    // track_group_id is inherited from Track Group TypeBox;
    unsigned int(1) multi_main_bitstream;
    bit(7) reserved;
    if(!multi_main_bitstream){
        unsigned int(8) num_sample_groups;
        for(i=0; i< num_sample_groups; i++){
        unsigned int(32)   group_description_index; }
    }
    else{
        unsigned int(8) num_main_bitstream;
        for(i=0); i<num_main_bitstream; i++) {
            unsigned int(8) frame_rate;
            unsigned int(8) num_sample_groups;
            for(i=0; i< num_sample_groups; i++){
                unsigned int(32) group_description_index;
            }
        }
    }
    string track_description;   // optional
}
```

In the aforementioned definition, the library picture track group is obtained by extending a track group data box and is identified by the 'a3lg' track group type. In all tracks including the 'a3lg' type TrackGroupTypeBox, tracks with the same group ID belong to the same track group. The semantics of each field in Avs3LibraryGroupBox is defined as follows:

The multi_main_bitstream field indicates whether the library picture track group is referred by a plurality of main bitstream tracks. When the value of this field is 1, it means that the library picture track group is referred by a plurality of main bitstream tracks. When the value of this field is 0, it means that the library picture track group is referred by only one main bitstream track. In an implementation, the value of this field is 0 by default.

The sample_number_max field indicates the quantity of LibrarySampleGroupEntry sample groups, which is used for indexing a current library picture track group in a main bitstream track or a main bitstream track with a special frame rate.

The group_description_index field indicates an index number of a LibrarySampleGroupEntry sample group, which is used for indexing a current library picture track group in a main bitstream track or a main bitstream track with a special frame rate.

The frame_rate field indicates a frame rate of a certain track in a plurality of main bitstream tracks when the library picture track is referred by the plurality of main bitstream tracks.

The track_description field is a character string ended with a null character and indicates description information of the library picture track.

3. Define a Library Picture Descriptor in DASH Signaling Extension:

In an embodiment of this application, the library picture descriptor Avs3Library is a SupplementalProperty element, and its @schemeIdUri property is "urn:avs:ims:2018:av3l". The descriptor may exist in an adaptation set layer or a representation layer. When the descriptor exists in the adaptation set layer, all representations in the adaptation set layer are described. When the descriptor exists in the representation layer, a corresponding representation is described. The Avs3Library descriptor describes related properties of a library picture representation. The specific properties are described in Table 1 as follows.

TABLE 1

| Elements and properties of Avs3Library descriptor | Use | Data type | Description |
| --- | --- | --- | --- |
| Avs3Library | 0... N | avs:ims:2018:av31 | The property of the field indicates information related to a library picture of a corresponding representation and representations having the field are all library picture tracks. |
| Avs3Library@ groupId | 0 | xs:unsignedInt (unsigned integer) | Indicates a group ID of a corresponding representation. The value of the field is the same as the track_group_id field in corresponding Avs3Library GroupBox. |

TABLE 1-continued

| Elements and properties of Avs3Library descriptor | Use | Data type | Description |
|---|---|---|---|
| Avs3Library@ multi_main_bitstream | CM | Bool | Indicates whether a corresponding representation is correspondingly referred by a plurality of main bitstreams on the library picture track. When the value of this field is 1, it means that the library picture track is referred by a plurality of main bitstreams. When the value of this field is 0, it means that the library picture track is referred by only one main bitstream. The value of this field is 0 by default. |
| Avs3Library@ frame_rate | CM | xs:unsignedShort (unsigned short) | Indicates a frame rate of a certain track in a plurality of main bitstream tracks when the library picture track is referred by the plurality of main bitstream tracks. |
| Avs3Library@ sample_number_min | CM | xs:unsignedByte (unsigned) | Indicates that the minimum value of a sample index number of a current library picture track group is indexed in a main bitstream track or a main bitstream track with a special frame rate. |
| Avs3Library@ sample_number_max | CM | xs:unsignedByte (unsigned) | Indicates that the maximum value of a sample index number of a current library picture track group is indexed in a main bitstream track or a main bitstream track with a special frame rate. |

In Table 1, "0 . . . N" in the "Use" column indicates the number (in particular, an integer), O indicates Optional, and CM indicates Conditional Mandatory. In the "Data type" column, xs indicates a short integer type.

In a specific example, assuming that there is media content A and media content B on a server side, the server side codes the content, respectively, to generate bitstreams. For example, for the media content A, a main bitstream StreamA and a library picture bitstream StreamAL are generated. For the media content B, a main bitstream StreamB is generated.

After the bitstreams are generated, the server side encapsulates StreamA into TrackA and StreamAL into TrackAL, and indexes the TrackReferenceTypeBox field of 'a3lr' type in TrackA to TrackAL.

In addition, the server side encapsulates StreamB into TrackB. Since there is no corresponding library picture track in TrackB, TrackB does not need to include the TrackReferenceTypeBox field of 'a3lr' type.

After encapsulation, for TrackA and TrackAL, the server side is used as one representation (such as RA and RAL) for description, respectively. The @dependencyId property of RA refers to RAL, indicating that the consumption of RA is dependent on RAL and RAL needs to be described by the Avs3Library descriptor. The server side takes TrackB as one representation (such as RB) for description, without special extension.

After track data is described, the server side generates DASH signaling and transmits a signaling file to a client.

After receiving the signaling file, the client may determine a dependency relationship between descriptors according to the signaling file. For example, RA is dependent on RAL and RAL is a library picture media resource. Assuming that a client 1 needs to request a media resource corresponding to RA and a client 2 needs to request a media resource corresponding to RB, the client 1 needs to request a media resource corresponding to RAL firstly from the server side and then request the media resource corresponding to RA from the server side, and the client 2 may directly request the media resource corresponding to RB.

After receiving the media resource corresponding to RAL and the media resource corresponding to RA, the client 1 firstly decodes the media resource corresponding to RAL and then decodes the media resource corresponding to RA. In addition, after receiving the media resource corresponding to RB, the client 2 may directly decode the media resource corresponding to RB.

In the aforementioned example, the media content includes a main bitstream and a library picture bitstream, which will be described again by taking that the media content includes a main bitstream and a plurality of library picture bitstreams as an example as below:

In a specific example of this application, assuming that there is media content A on a server side, the server side codes the content to generate a main bitstream StreamA and library picture bitstreams StreamAL1 and StreamAL2.

After the bitstreams are generated, the server side encapsulates StreamA into TrackA, StreamAL1 into TrackAL1, and StreamAL2 into TrackAL2. Meanwhile. TrackAL1 and TrackAL2 are associated by using a track group of 'a3lg' type, and parameters are as follows:

TrackAL1: {group_id=100; sample_number_min=0; sample_number_max=100}

TrackAL2: {group_id=100; sample_number_min=101; sample_number_max=200}

At this time, the TrackReferenceTypeBox field of 'a3lr' type in TrackA is indexed to a corresponding track group (by group_id, where group_id in this example is 100).

After encapsulation, for TrackA, TrackAL1 and TrackAL2, the server side is used as one representation (such as RA, RAL1 and RAL2) for description, respectively, where the @dependencyId property of RA needs to point to RAL1 and RAL2, indicating that the consumption of RA is dependent on RAL1 and RAL2. In addition, RAL1 and RAL2 needs to be described by the Avs3Library descriptor as follows:

RAL1:{group_id=100; sample_number_min=0; sample_number_max=100}

RAL2:{group_id=100; sample_number_min=101; sample_number_max=200}

After track data is described, the server side generates DASH signaling and transmits a signaling file to a client.

After receiving the signaling file, the client may determine a dependency relationship between descriptors according to the signaling file. For example, RA is dependent on RAL1 and RAL2, and RAL1 and RAL2 are library picture media resources. RAL1 corresponds to a front sample in RA. Assuming that a client 1 needs to request a media resource corresponding to RA, the client 1 needs to request media resources corresponding to RAL1 and RA from the server side. When consuming RA to approach to the 101st sample, the client 1 requests a media resource corresponding to RAL2 from the service side again.

For a property of a library picture in the AVS3 coding-decoding standard, the technical solution of the aforementioned embodiment of this application puts forward an encapsulation and signaling indication transmission method at a file track level. By means of the technical solution of the embodiments of this application, a library picture track and a main bitstream track may be flexibly associated at the file track level and this association relationship is indicated by signaling. At a data transmission stage, the client may determine whether to request a library picture track and request which kind of library picture track according to these information. Similarly, the client may determine a sequence for decoding different tracks at a decoding stage according to these information and finally allocate network and CPU resources reasonably.

The following describes apparatus embodiments of this application, and the apparatus embodiments may be used for performing the processing method for track data in a multimedia resource in the foregoing embodiments of this application. For details undisclosed in the apparatus embodiments of this application, reference may be made to the embodiments of the foregoing processing method for track data in a multimedia resource in this application.

Figure 9:
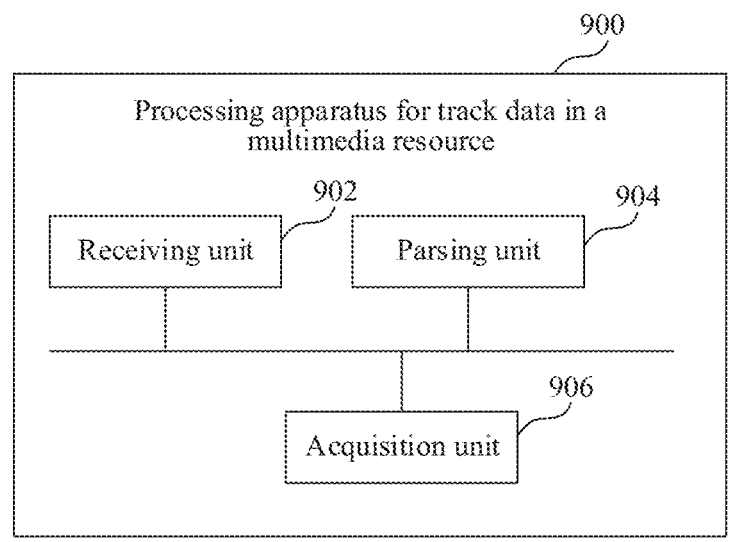
FIG. 9 is a block diagram of a processing apparatus for track data in a multimedia resource according to an embodiment of this application.

FIG. 9 is a block diagram of a processing apparatus for track data in a multimedia resource according to an embodiment of this application. The processing apparatus for track data in a multimedia resource may be arranged in a multimedia playing device. The multimedia playing device may be a smart phone, a tablet personal computer, etc.

Referring to FIG. 9, the processing apparatus 900 for track data in a multimedia resource according to an embodiment of this application includes: a receiving unit 902, a parsing unit 904 and an acquisition unit 906, where the receiving unit 902 is configured to receive a signaling file corresponding to a multimedia resource: the signaling file includes descriptors corresponding to a plurality of track data of the multimedia resource, respectively, the plurality of track data includes main bitstream track data corresponding to a main bitstream and library picture track data corresponding to a library picture bitstream, and dependency identifiers included in the descriptors correspond to the main bitstream track data pointing to descriptors corresponding to the library picture track data; the parsing unit 904 is configured to parse the signaling file, and determine a dependency relationship between the main bitstream track data and the library picture track data according to the dependency identifiers; and the acquisition unit 906 is configured to acquire the library picture track data and the main bitstream track data from a data source side in sequence according to the dependency relationship.

In some embodiments of this application, on the basis of the aforementioned solution, the descriptors corresponding to the library picture track data include first element information, and the first element information is used for indicating that the descriptors including the first element information are the descriptors corresponding to the library picture track data.

In some embodiments of this application, on the basis of the aforementioned solution, the plurality of track data includes at least two pieces of library picture track data, and a descriptor corresponding to each piece of library picture track data in the at least two pieces of library picture track data include second element information; and the second element information is used for indicating a track group where each piece of library picture track data in the at least two pieces of library picture track data resides.

In some embodiments of this application, on the basis of the aforementioned solution, a descriptor corresponding to each piece of library picture track data in the at least two pieces of library picture track data includes third element information; and the third element information is used for indicating whether the plurality of main bitstream track data is dependent on each piece of library picture track data in the at least two pieces of library picture track data.

In some embodiments of this application, on the basis of the aforementioned solution, if target library picture track data on which the plurality of main bitstream track data is dependent exists in the at least two pieces of library picture track data, a descriptor corresponding to the target library picture track data further includes fourth element information; and the fourth element information is used for indicating a frame rate of specified main bitstream track data in the plurality of main bitstream track data.

In some embodiments of this application, on the basis of the aforementioned solution, a descriptor corresponding to each piece of library picture track data in the at least two pieces of library picture track data further includes a sample index identifier. The sample index identifier is used for indicating a sample index number interval for indexing each piece of library picture track data in the at least two pieces of library picture track data from the main bitstream track data.

In some embodiments of this application, on the basis of the aforementioned solution, the sample index identifier includes fifth element information and sixth element information. The value of the fifth element information indicates the minimum value of a sample index number of each piece of library picture track data in the at least two pieces of library picture track data from the main bitstream track data. The value of the sixth element information indicates the maximum value of a sample index number of each piece of library picture track data in the at least two pieces of library picture track data from the main bitstream track data.

In some embodiments of this application, on the basis of the aforementioned solution, the main bitstream track data includes an index identifier. The index identifier is used for indicating library picture track data on which the main bitstream track data is dependent or indicating a library picture track group on which the main bitstream track data is dependent.

In some embodiments of this application, on the basis of the aforementioned solution, the main bitstream track data includes a track reference type data box. The track reference type data box includes a reference type field, and the reference type field is used for representing the index identifier.

In some embodiments of this application, on the basis of the aforementioned solution, the main bitstream track data includes a track reference data box. The track reference data box includes the track reference type data box.

In some embodiments of this application, on the basis of the aforementioned solution, the plurality of track data includes at least two pieces of library picture track data. Each piece of library picture track data in the at least two pieces of library picture track data includes a track group identifier. The track group identifier is used for indicating a track group where each piece of library picture track data in the at least two pieces of library picture track data resides.

In some embodiments of this application, on the basis of the aforementioned solution, each piece of library picture track data in the at least two pieces of library picture track data further includes first field information used for indicating whether a plurality of main bitstream track data is dependent on each piece of library picture track data in the at least two pieces of library picture track data. If the first field information indicates that a piece of main bitstream track data is dependent on library picture track data, the library picture track data further includes a field indicating the minimum value of a sample index number for indexing the library picture track data in the piece of main bitstream track data, and a field indicating the maximum value of a sample index number for indexing the library picture track data in the piece of main bitstream track data;

In some embodiments of this application, on the basis of the aforementioned solution, if the first field information indicates that a plurality of main bitstream track data is dependent on library picture track data, the library picture track data further includes a field indicating the minimum value of a sample index number for indexing the library picture track data in each piece of main bitstream track data in the plurality of main bitstream track data, a field indicating the maximum value of a sample index number for indexing the library picture track data in each piece of main bitstream track data in the plurality of main bitstream track data, and a field for indicating a frame rate of each piece of main bitstream track data in the plurality of main bitstream track data.

In some embodiments of this application, on the basis of the aforementioned solution, each piece of library picture track data in the at least two pieces of library picture track data further includes first field information used for indicating whether a plurality of main bitstream track data is dependent on each piece of library picture track data in the at least two pieces of library picture track data; and if the first field information indicates that a piece of main bitstream track data is dependent on library picture track data, the library picture track data further includes a field indicating a sample group quantity for indexing the library picture track data in the piece of main bitstream track data, and a field indicating a sample group index number for indexing the library picture track data in the piece of main bitstream track data:

In some embodiments of this application, on the basis of the aforementioned solution, if the first field information indicates that a plurality of main bitstream track data is dependent on library picture track data, the library picture track data further includes a field indicating a sample group quantity for indexing the library picture track data in each piece of main bitstream track data in the plurality of main bitstream track data, a field indicating a sample group index number for indexing the library picture track data in each piece of main bitstream track data in the plurality of main bitstream track data, and a field for indicating a frame rate of each piece of main bitstream track data in the plurality of main bitstream track data.

In some embodiments of this application, on the basis of the aforementioned solution, the processing apparatus 900 for track data in a multimedia resource further includes: a decoding unit configured to determine a decoding sequence according to the dependency relationship; and perform decoding processing on the library picture track data and the main bitstream track data in sequence according to the decoding sequence to obtain the multimedia resource.

In some embodiments of this application, on the basis of the aforementioned solution, the decoding unit is configured to: decode the main bitstream track data. During the decoding to obtain a sample index number interval that needs to refer to library picture track data in the main bitstream track data, determine library picture track data needing to be referred to from the plurality of library picture track data according to the sample index number interval; and decode the library picture track data needing to be referred to.

Figure 10:
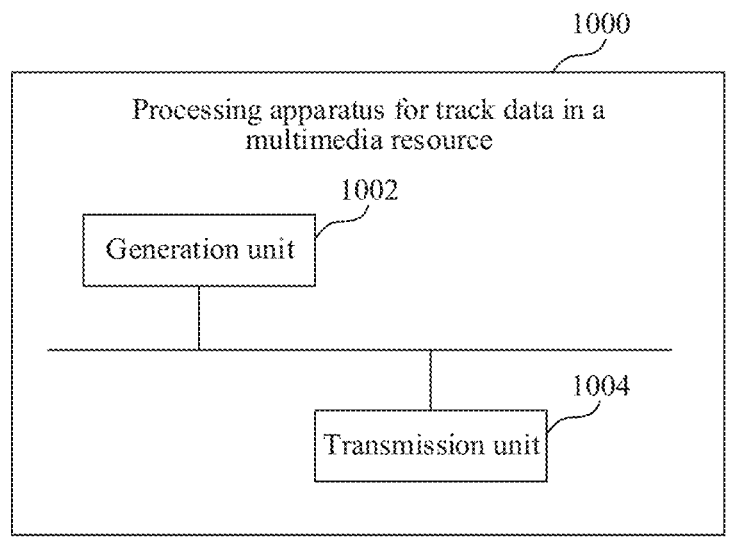
FIG. 10 is a block diagram of a processing apparatus for track data in a multimedia resource according to an embodiment of this application.

FIG. 10 is a block diagram of a processing apparatus for track data in a multimedia resource according to an embodiment of this application. The processing apparatus for track data in a multimedia resource may be arranged in a multimedia generation device. The multimedia generation device may be a smart phone, a tablet personal computer, etc.

Referring to FIG. 10, the processing apparatus 1000 for track data in a multimedia resource according to an embodiment of this application includes: a generation unit 1002 and a transmitting unit 1004.

where the generation unit 1002 is configured to generate a signaling file corresponding to a multimedia resource; the signaling file includes descriptors corresponding to a plurality of track data of the multimedia resource, respectively; the plurality of track data includes main bitstream track data corresponding to a main bitstream and library picture track data corresponding to a library picture bitstream; and dependency identifiers included in the descriptors correspond to the main bitstream track data pointing to descriptors corresponding to the library picture track data; the transmitting unit 1004 is configured to transmit the signaling file to a data receiver, so as to enable the data receiver to determine a dependency relationship between the main bitstream track data and the library picture track data according to the dependency identifiers in the signaling file; and acquire the library picture track data and the main bitstream track data in sequence from a data source side according to the dependency relationship.

In some embodiments of this application, on the basis of the aforementioned solution, the generation unit 1002 is further configured to: before generating a signaling file corresponding to a multimedia resource, generate main bitstream track data corresponding to a main bitstream and a library picture track data corresponding to a library picture bitstream, the main bitstream track data including an index identifier and the index identifier being used for indicating library picture track data on which the main bitstream track data is dependent.

Figure 11:
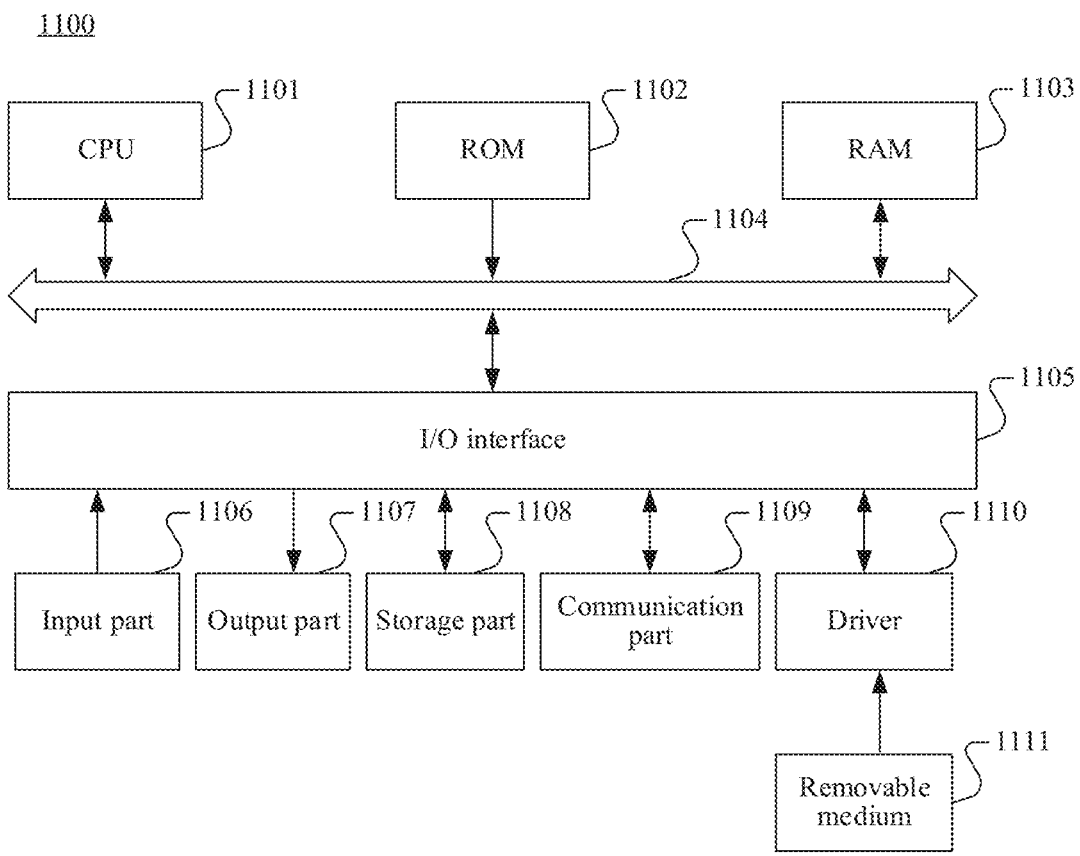
FIG. 11 is a schematic structural diagram of a computer system adapted to implement an electronic device according to an embodiment of this application.

FIG. 11 is a schematic structural diagram of a computer system adapted to implement an electronic device according to an embodiment of this application.

It should be noted that the computer system 1100 of the electronic device shown in FIG. 11 is merely an example, and does not constitute any limitation on functions and use ranges of the embodiments of this application.

As shown in FIG. 11, the computer system 1100 includes a central processing unit (CPU) 1101, which may perform various suitable actions and processing based on a program stored in a read-only memory (ROM) 1102 or a program loaded from a storage part 1108 into a random access memory (RAM) 1103, for example, perform the method described in the foregoing embodiments. The RAM 1103 further stores various programs and data required for operating the system. The CPU 1101, the ROM 1102, and the RAM 1103 are connected to each other through a bus 1104. An input/output (I/O) interface 1105 is also connected to the bus 1104.

The following components are connected to an I/O interface 1105: an input part 1106 including a keyboard, a mouse, etc., an output part 1107 including such as a cathode ray tube (CRT), a liquid crystal display (LCD), a loudspeaker, etc.; a storage part 1108 including a hard disk, etc.; and a communication part 1109 including a network interface card such as a local area network (LAN) card, modem, etc. The communication part 1109 performs communication processing by using a network such as the Internet. A driver 1110 is also connected to the I/O interface 1105 as required. A removable medium 1111, such as a magnetic disk, an optical disc, a magneto-optical disk, or a semiconductor memory, is mounted on the driver 1110 as required, so that a computer program read from the removable medium is installed into the storage part 1108 as required.

Particularly, according to an embodiment of this application, the processes described above by referring to the flowcharts may be implemented as a computer software program. For example, an embodiment of this application includes a computer program product. The computer program product includes a computer program stored in a computer-readable medium. The computer program includes a computer program used for performing the method shown in the flowchart. In such an embodiment, by using the communication part 1109, the computer program may be downloaded and installed from a network, and/or installed from the removable medium 1111. When the computer program is executed by the CPU 1101, the various functions defined in the system of this application are executed.

It should be noted that the computer-readable medium shown in this embodiment of this application may be a computer-readable signal medium or a non-transitory computer-readable storage medium or any combination thereof. The non-transitory computer-readable storage medium may be, for example, but is not limited to, an electric, magnetic, optical, electromagnetic, infrared, or semi-conductive system, apparatus, or device, or any combination of the above. More specific examples of the computer-readable storage medium may include, but are not limited to: an electrical connection having one or more wires, a portable computer magnetic disk, a hard disk, a RAM, a ROM, an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium including or storing a program, and the program may be used by or used in combination with an instruction execution system, an apparatus, or a device. In this application, the computer-readable signal medium may include a data signal transmitted in a baseband or as part of a carrier, and stores a computer-readable computer program. The transmitted data signal may be in a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wired medium, or the like, or any suitable combination thereof.

After considering the specification and practicing the implementations disclosed herein, a person skilled in the art may easily conceive of other implementations of this application. This application is intended to cover any variations, uses, or adaptive changes of this application. These variations, uses, or adaptive changes follow the general principles of this application and include common general knowledge or common technical means in the art, which are not disclosed in this application.

It is to be understood that this application is not limited to the precise structures described above and shown in the accompanying drawings, and various modifications and changes may be made without departing from the scope of this application. The scope of this application is limited only by the appended claims.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs receiving and/or parsing. In practical application, the foregoing functions may be allocated to and completed by different functional modules according to requirements, that is, an inner structure of a device is divided into different functional modules to implement all or a part of the functions described above.

What is claimed is:

1. A method for processing track data in a multimedia resource, performed at a computer device, the method comprising:

receiving a signaling file corresponding to a multimedia resource, wherein:
the signaling file includes descriptors corresponding to multiple track data of the multimedia resource;
the multiple track data includes (i) main bitstream track data corresponding to a main bitstream and (ii) library picture track data corresponding to a library picture bitstream; and
dependency identifiers included in the descriptors corresponding to the main bitstream track data point to the descriptors corresponding to the library picture track data, wherein:
a descriptor corresponding to a piece of the library picture track data comprises a sample index identifier for indicating a sample index number interval for indexing the piece of the library picture track data from the main bitstream track data;
parsing the signaling file, and determining a dependency relationship between the main bitstream track data and the library picture track data according to the dependency identifiers included in the descriptors in the signaling file; and
sequentially acquiring the library picture track data and the main bitstream track data from a data source side according to the determined dependency relationship, including:
for each piece of the main bitstream track data,
obtaining a sample index number interval corresponding to a sample index identifier of the piece of the main bitstream track data;
determining, from the library picture track data, a piece of the library picture track data referred to by the sample index number interval; and
decoding the piece of the main bitstream track data and the piece of the library picture track data.

2. The method according to claim 1, wherein the descriptors corresponding to the library picture track data include first element information, and the first element information is used for indicating that the descriptors including the first element information are the descriptors corresponding to the library picture track data.

3. The method according to claim 1, wherein:
the multiple track data includes at least two pieces of library picture track data; and
a respective descriptor corresponding to each piece of library picture track data in the at least two pieces of library picture track data includes second element information, the second element information is used for indicating a track group where each piece of library picture track data in the at least two pieces of library picture track data resides.

4. The method according to claim 3, wherein:
the respective descriptor corresponding to each piece of library picture track data in the at least two pieces of library picture track data includes third element information; and
the third element information includes a value that is used for indicating whether the plurality of main bitstream track data is dependent on each piece of library picture track data in the at least two pieces of library picture track data.

5. The method according to claim 4, wherein:
when target library picture track data on which the plurality of main bitstream track data is dependent exists in the at least two pieces of library picture track data, a descriptor corresponding to the target library picture track data further comprises fourth element information; and
the fourth element information is used for indicating a frame rate of specified main bitstream track data in the plurality of main bitstream track data.

6. The method according to claim 3, wherein:
the sample index identifier comprises fifth element information and sixth element information;
the fifth element information includes a value that indicates the minimum value of a sample index number of each piece of library picture track data in the at least two pieces of library picture track data from the main bitstream track data; and
the sixth element information includes a value that indicates the maximum value of a sample index number of each piece of library picture track data in the at least two pieces of library picture track data from the main bitstream track data.

7. The method according to claim 1, wherein the main bitstream track data includes an index identifier, and the index identifier is used for indicating library picture track data on which the main bitstream track data is dependent or indicating a library picture track group on which the main bitstream track data is dependent.

8. The method according to claim 7, wherein the main bitstream track data comprises a track reference type data box, the track reference type data box comprises a reference type field, and the reference type field is used for representing the index identifier.

9. The method according to claim 1, wherein the plurality of track data comprises at least two pieces of library picture track data, and each piece of library picture track data in the at least two pieces of library picture track data comprises a track group identifier; and the track group identifier is used for indicating a track group where each piece of library picture track data in the at least two pieces of library picture track data resides.

10. The method according to claim 9, wherein each piece of library picture track data in the at least two pieces of library picture track data further comprises first field information used for indicating whether a plurality of main bitstream track data is dependent on each piece of library picture track data in the at least two pieces of library picture track data; and
when the first field information indicates that a piece of main bitstream track data is dependent on library picture track data, the library picture track data further comprises a field indicating the minimum value of a sample index number for indexing the library picture track data in the piece of main bitstream track data, and a field indicating the maximum value of a sample index number for indexing the library picture track data in the piece of main bitstream track data.

11. The method according to claim 9, wherein each piece of library picture track data in the at least two pieces of library picture track data further comprises first field information used for indicating whether a plurality of main bitstream track data is dependent on each piece of library picture track data in the at least two pieces of library picture track data; and
when the first field information indicates that a piece of main bitstream track data is dependent on library picture track data, the library picture track data further comprises a field indicating a sample group quantity for indexing the library picture track data in the piece of main bitstream track data, and a field indicating a sample group index number for indexing the library picture track data in the piece of main bitstream track data.

12. The method according to claim 1, further comprising:
determining a decoding sequence according to the dependency relationship; and
performing decoding processing on the library picture track data and the main bitstream track data in sequence according to the decoding sequence to obtain the multimedia resource.

13. The method according to claim 12, wherein performing decoding processing on the library picture track data and the main bitstream track data in sequence according to the decoding sequence comprises:
decoding the main bitstream track data;
during the decoding to a sample index number interval that needs to refer to library picture track data in the main bitstream track data, determining library picture track data needing to be referred to from the plurality of library picture track data according to the sample index number interval; and
decoding the library picture track data needing to be referred to.

14. A computer device, comprising:
one or more processors; and
memory storing one or more programs, the one or more programs comprising instructions that, when executed by the one or more processors, cause the one or more processors to perform operations comprising:
receiving a signaling file corresponding to a multimedia resource, wherein:
the signaling file includes descriptors corresponding to multiple track data of the multimedia resource;
the multiple track data includes (i) main bitstream track data corresponding to a main bitstream and (ii) library picture track data corresponding to a library picture bitstream; and
dependency identifiers included in the descriptors corresponding to the main bitstream track data point to the descriptors corresponding to the library picture track data wherein:
a descriptor corresponding to a piece of the library picture track data comprises a sample index identifier for indicating a sample index number interval for indexing the piece of the library picture track data from the main bitstream track data;
parsing the signaling file, and determining a dependency relationship between the main bitstream track data and the library picture track data according to the dependency identifiers included in the descriptors in the signaling file; and
sequentially acquiring the library picture track data and the main bitstream track data from a data source side according to the determined dependency relationship, including:
for each piece of the main bitstream track data,
obtaining a sample index number interval corresponding to a sample index identifier of the piece of the main bitstream track data;
determining, from the library picture track data a piece of the library picture track data referred to by the sample index number interval; and
decoding the piece of the main bitstream track data and the piece of the library picture track data.

15. The computer device according to claim 14, wherein the descriptors corresponding to the library picture track data include first element information, and the first element information is used for indicating that the descriptors including the first element information are the descriptors corresponding to the library picture track data.

16. The computer device according to claim 14, wherein:
the multiple track data includes at least two pieces of library picture track data; and
a respective descriptor corresponding to each piece of library picture track data in the at least two pieces of library picture track data includes second element information, the second element information is used for indicating a track group where each piece of library picture track data in the at least two pieces of library picture track data resides.

17. A non-transitory computer-readable storage medium, storing one or more instructions, the one or more instructions, when executed by one or more processors of a computer device, cause the computer device to perform operations comprising:
receiving a signaling file corresponding to a multimedia resource, wherein:
the signaling file includes descriptors corresponding to multiple track data of the multimedia resource;
the multiple track data includes (i) main bitstream track data corresponding to a main bitstream and (ii) library picture track data corresponding to a library picture bitstream; and
dependency identifiers included in the descriptors corresponding to the main bitstream track data point to the descriptors corresponding to the library picture track data, wherein:
a descriptor corresponding to a piece of the library picture track data comprises a sample index identifier for indicating a sample index number interval for indexing the piece of the library picture track data from the main bitstream track data;
parsing the signaling file, and determining a dependency relationship between the main bitstream track data and the library picture track data according to the dependency identifiers included in the descriptors in the signaling file; and
sequentially acquiring the library picture track data and the main bitstream track data from a data source side according to the determined dependency relationship, including:
for each piece of the main bitstream track data,
obtaining a sample index number interval corresponding to a sample index identifier of the piece of the main bitstream track data;
determining, from the library picture track data, a piece of the library picture track data referred to by the sample index number interval; and
decoding the piece of the main bitstream track data and the piece of the library picture track data.

18. The non-transitory computer-readable storage medium according to claim 17, wherein the main bitstream track data includes an index identifier, and the index identifier is used for indicating library picture track data on which the main bitstream track data is dependent or indicating a library picture track group on which the main bitstream track data is dependent.

19. The non-transitory computer-readable storage medium according to claim 17, wherein the plurality of track data comprises at least two pieces of library picture track data, and each piece of library picture track data in the at least two pieces of library picture track data comprises a track group identifier; and the track group identifier is used for indicating a track group where each piece of library picture track data in the at least two pieces of library picture track data resides.

* * * * *